Figure 1:
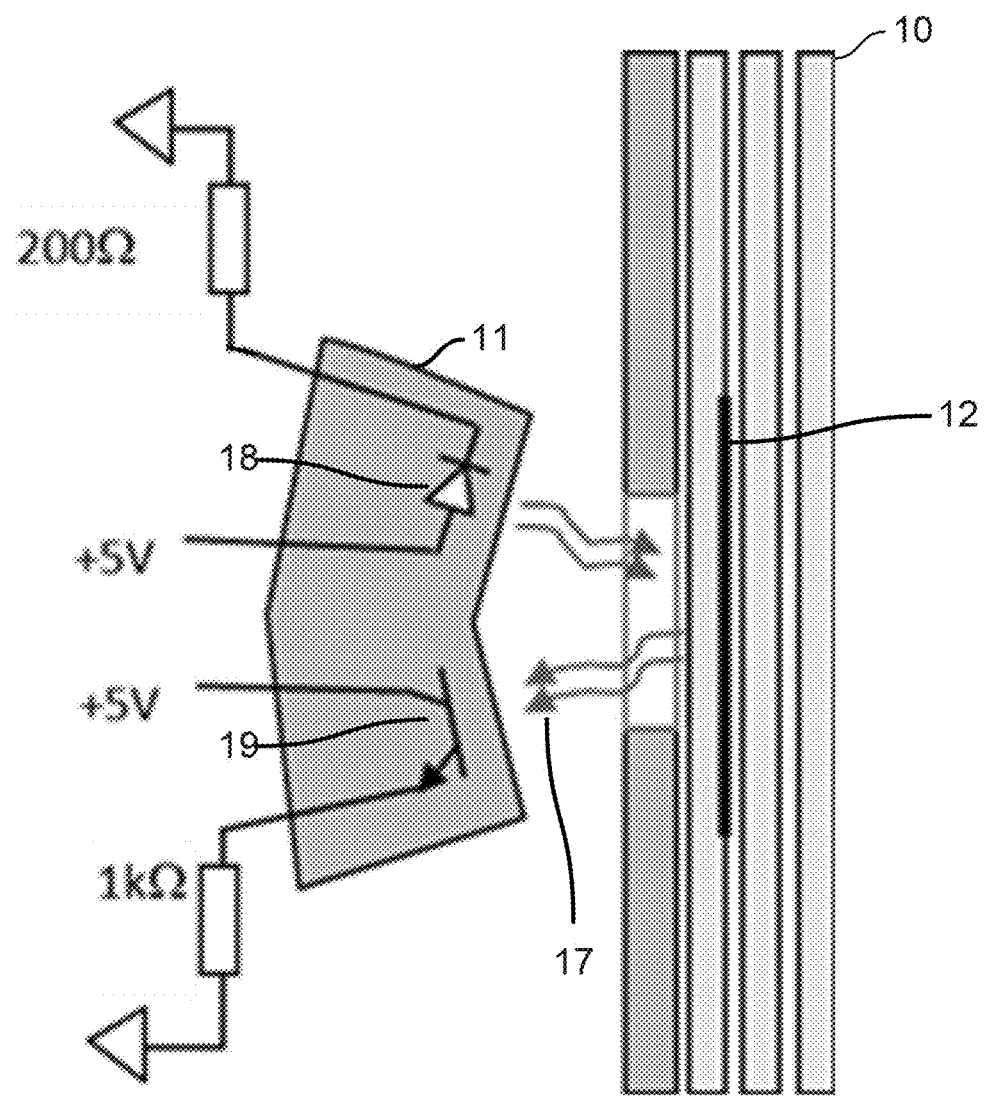
Figure 2:
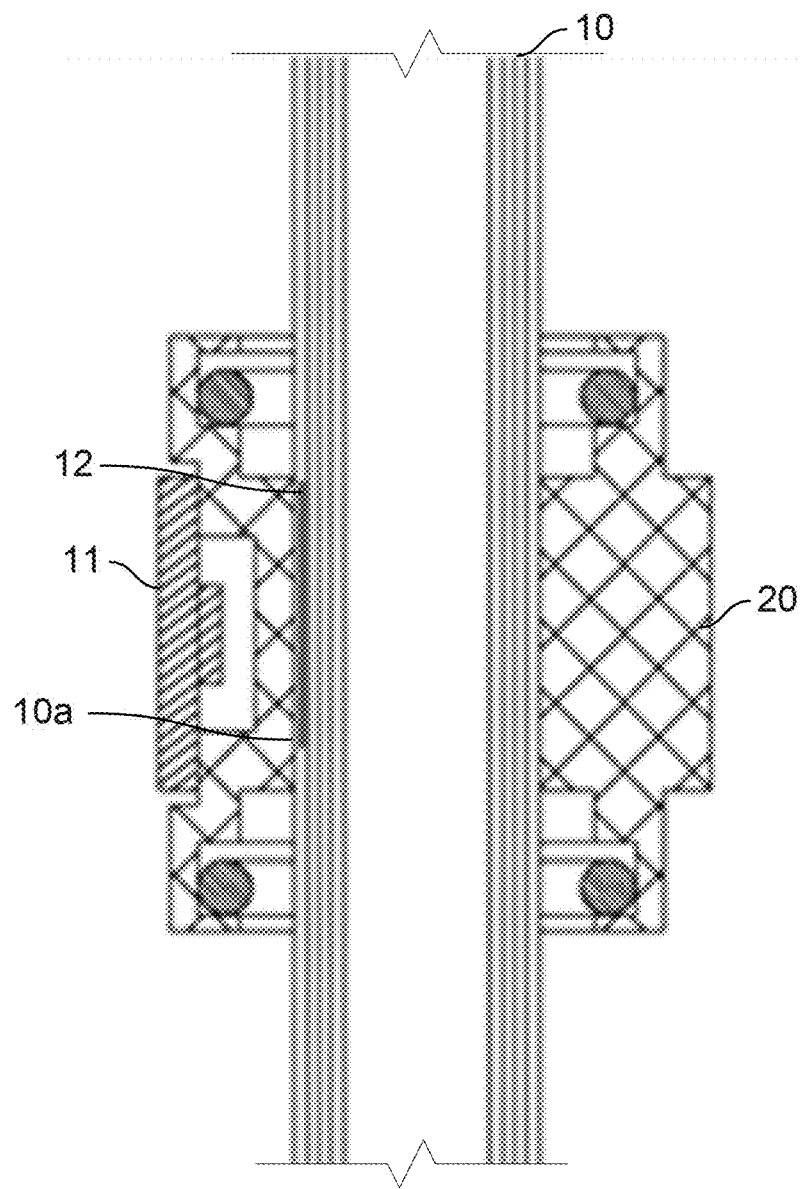

US011029240B2

(12) United States Patent
Hering et al.

(10) Patent No.: US 11,029,240 B2
(45) Date of Patent: Jun. 8, 2021

(54) WICK MOISTURE SENSOR FOR AIRBORNE PARTICLE CONDENSATIONAL GROWTH SYSTEMS

(71) Applicant: Aerosol Dynamics Inc., Berkeley, CA (US)

(72) Inventors: Susanne Vera Hering, Berkeley, CA (US); Steven Russel Spielman, Oakland, CA (US); Gregory Stephen Lewis, Berkeley, CA (US)

(73) Assignee: Aerosol Dynamics Inc., Berkeley, CA (US)

( * ) Notice: Subject to any disclaimer, the term of this patent is extended or adjusted under 35 U.S.C. 154(b) by 0 days.

(21) Appl. No.: 16/159,604

(22) Filed: Oct. 12, 2018

(65) Prior Publication Data

US 2020/0116619 A1 Apr. 16, 2020

(51) Int. Cl.

| | |
|---|---|
| *G01N 21/00* | (2006.01) |
| *G01N 15/06* | (2006.01) |
| *F28B 1/02* | (2006.01) |
| *F28B 11/00* | (2006.01) |

(52) U.S. Cl.

CPC ............. *G01N 15/065* (2013.01); *F28B 1/02* (2013.01); *F28B 11/00* (2013.01)

(58) Field of Classification Search

CPC .... B01D 47/00; B01D 5/009; B01D 53/1475; G01N 15/06; G01N 15/065; G01N 21/3554

USPC .......... 356/335–343, 73; 250/339.1; 324/694

See application file for complete search history.

(56) References Cited

U.S. PATENT DOCUMENTS

| | | | |
|---|---|---|---|
| 2,042,095 | A | 5/1936 | Grant |
| 2,684,008 | A | 7/1954 | Vonnegut |
| 2,721,495 | A | 10/1955 | Schaefer |
| 3,011,387 | A | 12/1961 | Johnson |
| 3,011,390 | A | 12/1961 | Van Luik |
| 3,037,421 | A | 6/1962 | Bigelow |
| 3,592,546 | A | 7/1971 | Gussman |
| 3,632,210 | A | 1/1972 | Rich |
| 3,694,085 | A | 9/1972 | Rich |
| 3,738,751 | A | 6/1973 | Rich |
| 3,806,248 | A | 4/1974 | Sinclair |

(Continued)

FOREIGN PATENT DOCUMENTS

| | | | |
|---|---|---|---|
| DE | 102005001992 | | 7/2006 |
| EP | 0658461 | A1 | 11/1993 |
| JP | 4108034 | B2 | 6/2008 |

OTHER PUBLICATIONS

PCT International Search Report, PCT Patent Application No. PCT/US2018/055911.

(Continued)

*Primary Examiner* — Hoa Q Pham

(74) *Attorney, Agent, or Firm* — Vierra Magen Marcus LLP

(57) ABSTRACT

A wick liquid sensor suitable for use in a particle condensation device is provided. The sensor includes a light source configured to illuminate a surface of the wick. A detector is configured to detect wick reflected light from the light source and determine the intensity of reflected light. The wick is formed from a porous media that is wettable by the liquid, and becomes translucent when filled with the liquid. The amount of reflectivity decreases as the saturation content of the liquid in the wick increases.

20 Claims, 6 Drawing Sheets

(56) References Cited

U.S. PATENT DOCUMENTS

| | | | |
|---|---|---|---|
| 3,890,046 A | | 6/1975 | Hart |
| 4,293,217 A | | 10/1981 | Bird |
| 4,449,816 A | | 5/1984 | Kohsaka |
| 4,761,074 A | | 8/1988 | Kohsaka |
| 4,790,650 A | | 12/1988 | Keady |
| 4,792,199 A | | 12/1988 | Borden |
| 4,868,398 A | | 9/1989 | Mulcey |
| 4,950,073 A | | 8/1990 | Sommer |
| 4,967,187 A | | 10/1990 | Dumas |
| 5,011,281 A | | 4/1991 | Harris |
| 5,026,155 A | | 6/1991 | Ockovic |
| 5,045,693 A | * | 9/1991 | McKeon .............. G01V 5/102 250/265 |
| 5,098,657 A | | 3/1992 | Blackford |
| 5,118,959 A | | 6/1992 | Caldow |
| 5,176,723 A | | 1/1993 | Liu |
| 5,239,356 A | | 8/1993 | Hollander |
| 5,278,626 A | | 1/1994 | Poole |
| 5,519,490 A | | 5/1996 | Nakata |
| 5,525,514 A | * | 6/1996 | Jacobs ............ G01N 33/54386 422/64 |
| 5,659,388 A | | 8/1997 | Scheer |
| 5,675,405 A | | 10/1997 | Schildmeyer |
| 5,872,622 A | | 2/1999 | Schildmeyer |
| 5,903,338 A | | 5/1999 | Mavliev |
| 5,964,181 A | * | 10/1999 | Pereyra ................ G01K 11/06 116/206 |
| 6,330,060 B1 | | 12/2001 | Flagan |
| 6,469,780 B1 | | 10/2002 | McDermott |
| 6,498,641 B1 | | 12/2002 | Schildmeyer |
| 6,529,272 B2 | | 3/2003 | Flagan |
| 6,567,157 B1 | | 5/2003 | Flagan |
| 6,829,044 B2 | | 12/2004 | Liu |
| 6,980,284 B2 | | 12/2005 | Ahn |
| 7,494,567 B2 | | 2/2009 | Haran |
| 7,656,510 B2 | | 2/2010 | Roberts |
| 7,719,683 B2 | | 5/2010 | Ahn |
| 7,724,368 B2 | | 5/2010 | Ahn |
| 7,828,273 B2 | | 11/2010 | Molter |
| 7,988,135 B2 | | 8/2011 | Molter |
| 8,072,598 B2 | | 12/2011 | Ahn |
| 8,459,572 B2 | | 6/2013 | Hering |
| 8,465,791 B2 | | 6/2013 | Liu |
| 8,576,400 B2 | * | 11/2013 | Hulteen ............... G01N 21/274 356/445 |
| 8,603,247 B2 | | 12/2013 | Liu |
| 9,535,022 B1 | * | 1/2017 | Meredith .............. G01N 27/00 |
| 9,579,662 B2 | | 2/2017 | Hering |
| 9,610,531 B2 | | 4/2017 | Hering |
| 2003/0020910 A1 | * | 1/2003 | Peterson ............ G01N 15/1459 356/338 |
| 2004/0051817 A1 | * | 3/2004 | Takahashi ............ B41J 2/04581 349/1 |
| 2005/0134580 A1 | * | 6/2005 | Sonoda ................ G09G 3/3433 345/211 |
| 2006/0001866 A1 | * | 1/2006 | Clarke ............. G01N 21/95684 356/300 |
| 2009/0252870 A1 | * | 10/2009 | Munneke ............... B43M 5/042 427/207.1 |
| 2015/0112165 A1 | * | 4/2015 | Heikenfeld .......... A61B 5/0531 600/307 |
| 2015/0293016 A1 | * | 10/2015 | Perkins ................... E21B 49/08 356/70 |
| 2016/0054589 A1 | * | 2/2016 | Otts ........................ A61L 31/06 351/159.03 |

OTHER PUBLICATIONS

PCT Written Opinion of the International Searching Authority, PCT Patent Application No. PCT/US2018/055911.

Hoppel, W. A., Twomey, S., & Wojciechowski, T. A. (1979). A segmented thermal diffusion chamber for continuous measurements of CN. Journal of Aerosol Science, 10(4), 369-373.

Leaitch, R., & Megaw, W. J. (1982). The diffusion tube; a cloud condensation nucleus counter for use below 0.3% supersaturation. Journal of Aerosol Science, 13(4), 297-319.

Bricard, J., Delattre, P., Madelaine, G. and Pourprix, M., 1976, in Fine Particles (Edited by Liu, B. Y. H.) Academic Press, New York. pp. 565-580.

"Argawal and Sem J. , 1980, Continuous flow, single-particle-counting condensation nucleus counter, Journal of Aerosol Science, vol. I I, pp. 343-357. Cite with reference to Bricard".

Hering, S. V., & Stolzenburg, M. R. (2005). A method for particle size amplification by water condensation in a laminar, thermally diffusive flow. Aerosol Science and Technology, 39(5), 428-436.

Hering, S. V., Stolzenburg, M. R., Quant, F. R., Oberreit, D. R., & Keady, P. B. (2005). A laminar-flow, water-based condensation particle counter (WCPC). Aerosol Science and Technology, 39(7), 659-672.

Weber, R. J., Orsini, D., Daun, Y., Lee, Y. N., Klotz, P. J., & Brechtel, F. (2001). A particle-into-liquid collector for rapid measurement of aerosol bulk chemical composition. Aerosol Science & Technology, 35(3), 718-727.

Eiguren Fernandez, A., Lewis, G. S., & Hering, S. V. (2014). Design and laboratory evaluation of a sequential spot sampler for time-resolved measurement of airborne particle composition. Aerosol Science and Technology, 48(6), 655-663.

Hering, S. V., Lewis, G. S., Spielman, S. R., & Eiguren-Fernandez, A. (2019). A MAGIC concept for self-sustained, water-based, ultrafine particle counting. Aerosol Science and Technology, 53(1), 63-72.

Skala, G. F. (1963). A New Instrument for the Continuous Measurement of Condensation Nuclei. Analytical Chemistry, 35(6), 702-706.

Roberts, G.C., & Nenes, A. (2005). A continuous-flow streamwise thermal-gradient CCN chamber for atmospheric measurements. Aerosl Science and Technology, 39(3), 206-221.

Hering, et al., U.S. Appl. No. 16/671,594 Humidity Conditioning for Water-Based Condensational Growth of Ulrtafine Particles, filed Nov. 1, 2019.

International Preliminary Report on Patentability, dated Apr. 23, 2020, PCT Application No. PCT/US2018/055911.

* cited by examiner

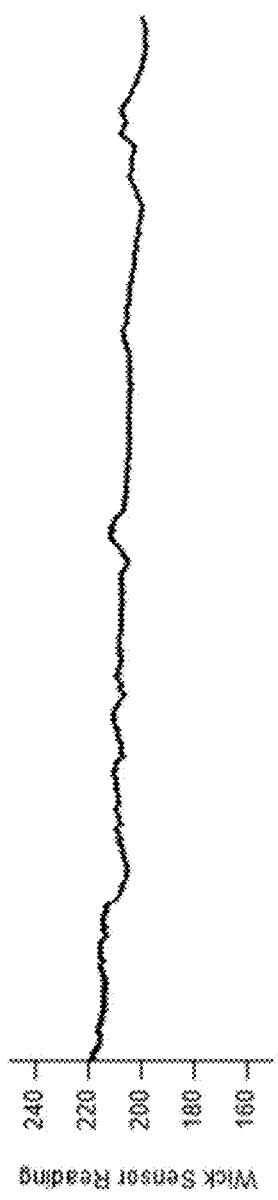
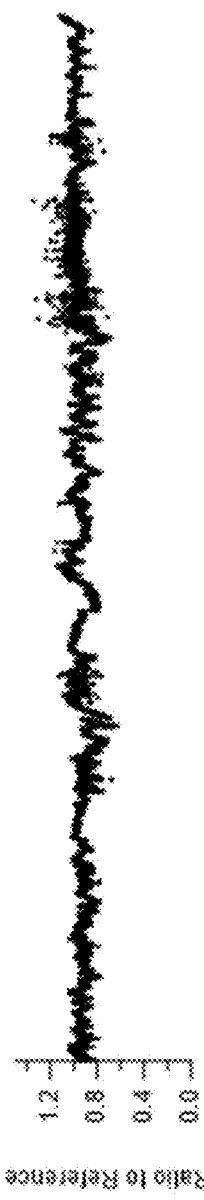
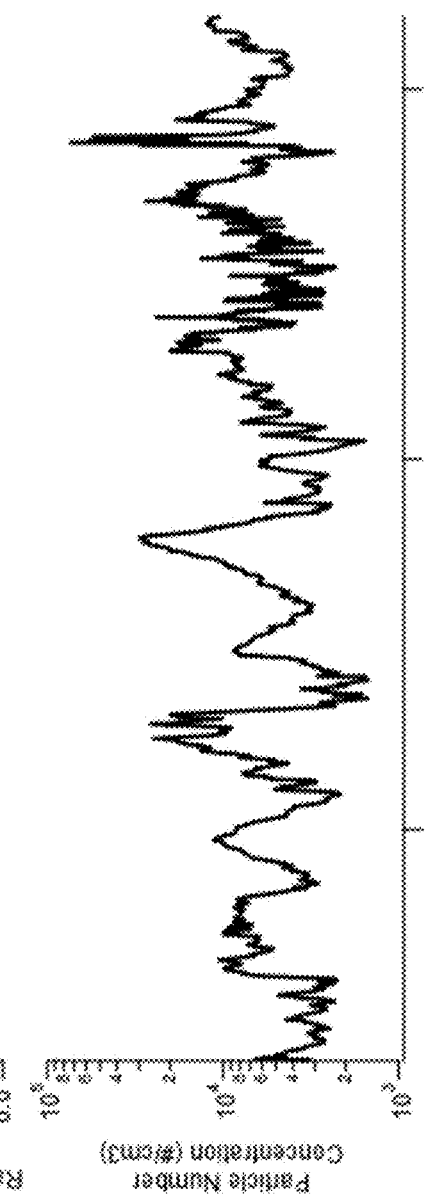
FIGURE 6A
FIGURE 6B
FIGURE 6C

WICK MOISTURE SENSOR FOR AIRBORNE PARTICLE CONDENSATIONAL GROWTH SYSTEMS

CROSS REFERENCE TO RELATED APPLICATIONS

This application claims the benefit of priority to U.S. Provisional Application No. 62/572,394, filed Oct. 13, 2017, entitled "Wick Moisture Sensor for Airborne Particle Condensational Growth Systems", which is incorporated herein by reference in its entirety.

This invention was made with government support under contracts #NNX15CC78P #NNX16CC22C from NASA. The government has certain rights in this invention.

BACKGROUND

Many of the particles that are suspended in air, or other gases, are too small to be easily detected or collected. For example, most particles found in ambient air are less than 100 nm in diameter. At these small sizes it is difficult to count individual particles optically, or to collect them inertially. One approach for circumventing this limitation is to enlarge these ultrafine particles through condensation to form micrometer sized droplets that are more readily detected or manipulated. Currently, particle enlargement is employed in many commercially available condensation particle counters, as well as in condensation-based particle collectors, and air-to-air particle concentrators.

Many condensation-based instruments contain a wick that holds the working fluid that vaporizes, and subsequently condenses on the particles. The performance of these instruments depends on maintaining a saturated wick, that is a wick that is filled to near, or at, capacity with the condensable working fluid. In most instruments the saturation of the wick is ensured by maintaining direct contact between the wick and a liquid reservoir. In portable condensation instruments which require tolerance to tipping and motion, or operation in microgravity environments, it is not possible to use liquid reservoirs. For such devices, all of the working fluid must be held within the wick itself. Typically, these reservoirless instruments start with a saturated wick, but subsequently fail after some hours of use as the condensing fluid is consumed.

SUMMARY

The technology describes a wick sensor that detects the saturation level of the wick commonly used in a condensation system. Specific application is given to a water-based condensation system in which the wick saturation level can either increase, or decrease, during operation.

One general aspect includes a wick moisture sensor, including: a light source configured to illuminate a surface of the wick. The wick moisture sensor also includes a detector configured to detect reflected light from the light source that is reflected by the wick, and determine the intensity of reflected light. The wick liquid sensor also includes where the wick is formed from a porous media that is wettable by the liquid, and becomes translucent when filled with the liquid.

Another aspect includes a particle detection system, including: a wick sensor configured to determine liquid saturation of the wick, the wick is formed from multiple layers of a porous media which is wettable by the liquid and translucent when filled with the liquid, the wick sensor including, an illumination source positioned to illuminate the wick; a dark material placed under one or more layers of the wick opposite of the illumination source and a detector configured to measure the intensity of light from the illumination source scattered by wick.

One general aspect includes a particle condensation system, including: a growth chamber including a wick formed from multiple layers of a porous material which is wettable by a liquid and translucent when filled with the liquid. The particle condensation system also includes a wick sensor including a light source configured to illuminate a surface of the wick and a detector configured to detect wick reflected light from the light source and determine the intensity of reflected light.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is a schematic diagram of a wick moisture sensor including a reflectivity detector, layers of wick and a light-absorbing layer.

FIG. 2 is a cross-section view of the wick sensor, showing a portion of the wick.

FIG. 3 is a schematic diagram of a three-stage water condensation system showing placement of the wick sensor.

FIG. 4A is a graph of the response of the wick sensor while the wick was operated in a mode in which it was constantly losing water.

FIG. 4B is a graph illustrating the particle counting efficiency of the system as the ratio of this indicated particle concentration to that measured by a standard, benchtop condensation particle counter.

FIG. 4C is a graph of a time series of ambient particle number concentrations.

FIG. 5 is a graph of the dependence of the exiting flow dew point in the operating temperature of the moderator stage of a threestage condensation growth system for three ranges of input dew point.

FIG. 6A is a graph of the response of the wick sensor in a second embodiment of a system while the wick was operated in a mode in which it was constantly losing water.

FIG. 6B is a graph illustrating the particle counting efficiency of in a second embodiment of a system as the ratio of this indicated particle concentration to that measured by a standard, benchtop condensation particle counter.

FIG. 6C is a graph of a time series of ambient particle number concentrations in a second embodiment of a system.

DETAILED DESCRIPTION

A wick sensor comprising an optical device configured to assess the extent to which the wick material is saturated with liquid is disclosed. The reflectivity of the wick, or optical appearance, changes with the saturation level of the wick. Typically, a wick material used in condensation systems is an absorbent material with a porous structure. Such materials scatter light when dry, due to their microporous structure. As these pores fill with liquid, the wick material becomes translucent. The wick sensor disclosed herein monitors this translucence. The wick sensor includes a reflectivity sensor, consisting of a small light emitting diode (in the infrared or at other wavelengths) and photo transistor.

These components, and associated circuit board, are mounted in a housing placed immediately on the outside of the wick, and are positioned such that the sensor views the outer layer of the wick. A dark object is placed immediately underneath the layer of wick viewed by the reflectivity sensor. A clear window in the sensor housing allows the sensor to view the wick while protecting the sensor and its electronics from the moist wick environment.

When the wick is moist, much of the incident light from the sensor is transmitted through the wick material and absorbed, such that the reflected light signal is small. As the material dries, the reflected light signal rises, and a portion of the light scattered from the outer layer of the wick material is captured by a photo detector. This change is most apparent when a dark material is placed underneath the outer layer of the wick, as it makes the wick appear dark when saturated. The wick signal can be used to warn the operator of a drying wick, or it can be used to control the instrument operating parameters.

One application of the wick sensor is to three-stage water-based condensation systems used for measuring ambient air. With this system the water-saturation of the wick can either increase or decrease during operation, depending on ambient conditions and operating temperatures. During operation water may be taken up by the wick due to moisture present in the air that is sampled. Alternatively, the wick can lose water due to the evaporation that must occur as part of the condensation process. The net change in water held by the wick can be regulated through control of the operating temperature of the final, water recovery stage. The wick sensor of this invention indicates the saturation level of the wick, and provides feedback needed to control the wick saturation level. This feedback enables operation such that the extent of water vapor uptake and removal are balanced. If operated in an environment with sufficient moisture in the sampled airstream, the wick sensor enables operation of the system over extended periods of time, weeks to months, without need to replenish the wick.

This wick sensor assesses the moisture content of a microporous material such as is commonly used as a wick in airborne particle condensation systems. The wick sensor measures the optical reflectivity of this material. This reflectivity, or optical appearance, changes when the wick becomes saturated with a liquid, such as water or alcohol.

FIG. 1 illustrates the operating principle of the wick sensor. The wick is formed from several layers of a membrane filter material 10. This appears bright white when dry, due to its microporous structure which scatters light. As the wick becomes saturated, these pores fill with water or other liquid, and the wick becomes translucent. The wick sensor detects this change in the optical appearance. Specifically, the wick sensor has a reflectivity sensor 11 with a small light-emitting diode 18 and photo transistor 19 that is mounted to directly view the outer layer of the wick. A piece of dark material 12, is placed underneath one layer of the wick material, immediately opposite the sensor. All of these components are housed in the interior of the instrument, and are shielded from stray ambient light. When the wick is dry, light 17 from the light-emitting is reflected from the wick surface, and detected by the photo transistor. As the wick becomes translucent, the dark material under the wick becomes visible, and the amount of reflected light is reduced. In this manner, the signal from the photo transistor is small when the wick is wet, and increases as the wick dries.

FIG. 2 shows and example implementation of the wick sensor 11. The wick 10 is formed by rolling a sheet of commercially available membrane filter media (such as Merck Millipore DVPP, Merck KGaA, Darmstadt, Germany) to form a tube. In a condensation particle counter, this tube lines the walls through which the air flows. A piece of dark-colored filter 12 (mixed cellulose esters membrane, Merck Millipore AABP) is placed underneath an outer layer of the wick. Alternatives for the dark material 12 include coloring the wick with a black, water-proof marker, and installing a piece of gray or other non-white mylar film. The color selected should be such that it absorbs enough light at the wavelength of the light source to give a detectable signal change. The wick sensor 11, which in this embodiment may comprise a small circuit board containing an LED-phototransistor pair (not shown) is attached to a housing 20 that surrounds the wick 10. In this implementation a Fairchild QRE1113 sensor was used. The wick sensor 11 is positioned such that the sensor looks directly through one layer 10*a* of the porous wick material to the black filter media. A sensor housing 20 is made of a clear material and protects the reflectivity sensor from the moist wick environment. Alternatively, this housing may be equipped with a clear window that allows the reflectivity sensor to view the wick. When the wick is wet, this incident light is transmitted through the wick material and absorbed, such that the reflected light signal is small. As the material dries, the reflected light signal rises, and a portion of the light scattered from the outer layer of the wick material is captured by the photo detector.

FIG. 3 illustrates the incorporation of the wick sensor with a three-stage, water-based airborne particle condensation system, such as that described by U.S. Pat. No. 9,610,531 (Hering et al.) which is hereby fully incorporated herein by reference. This system has three temperature regions through which air flows. These are a conditioner 31 that is cold, an initiator 32 that is warm, and a moderator 34 that is cold. A wick 35 wetted with water spans all three temperature regions. The wick sensor 33 is mounted in a housing between the initiator and moderator temperature stages. An air sample enters the device through inlet 41 into the cold conditioner region 31, where the flow cools and water vapor from the sampled air deposits onto the wick. Next, this cooled flow enters the warm initiator region 32, where water evaporates from the wick into the flow. Because water vapor transport is faster than heat transport, the flow relative humidity increases above 100%, typically to about 130-140%, in the center core of the flow. Under these supersaturated conditions water condenses on the particles present in the air stream, initiating the formation of droplets. In the final, cool moderator stage 34, the droplets continue to grow through condensation, while at the same time water vapor is recovered by the wick. Capillary action transports the liquid water back to the warm, initiator portion of the wick. The rate of water vapor recovery is controlled by the temperature of the walls in this moderator stage, which in turn is set based on the wick sensor reading. The components 31, 32, 34 and 35 are collectively referred to as a "growth tube" 30. Flow exits the growth tube through a device 42 to and exit port 43. The device 42 may be an optical detector to count the droplets formed by the growth tube, or it may be a collector to capture these droplets, or it may contain a set of aerodynamic focusing lenses to concentrate the particles into a small portion of the flow, or it may provide a means of electrically charging the droplets. Device 30 may also include a processing device 100 which receives feedback signal 130 from the wick sensor 33, and may be programmed to control a temperature controller 120. The processing device may be any programmable hardware or microprocessor operable to execute instructions to control the temperature controller. The temperature controller may comprise one or more individual controllers 121, 122, 123, each of which may regulate the electrical power directed to a respective heating element and/or cooling element 121*a*, 122*a*, 123*a*, such elements generally illustrated as being coupled to the respective regions 31, 32 and 34, allowing automatic control the instrument 30 during operation.

Figure 3:
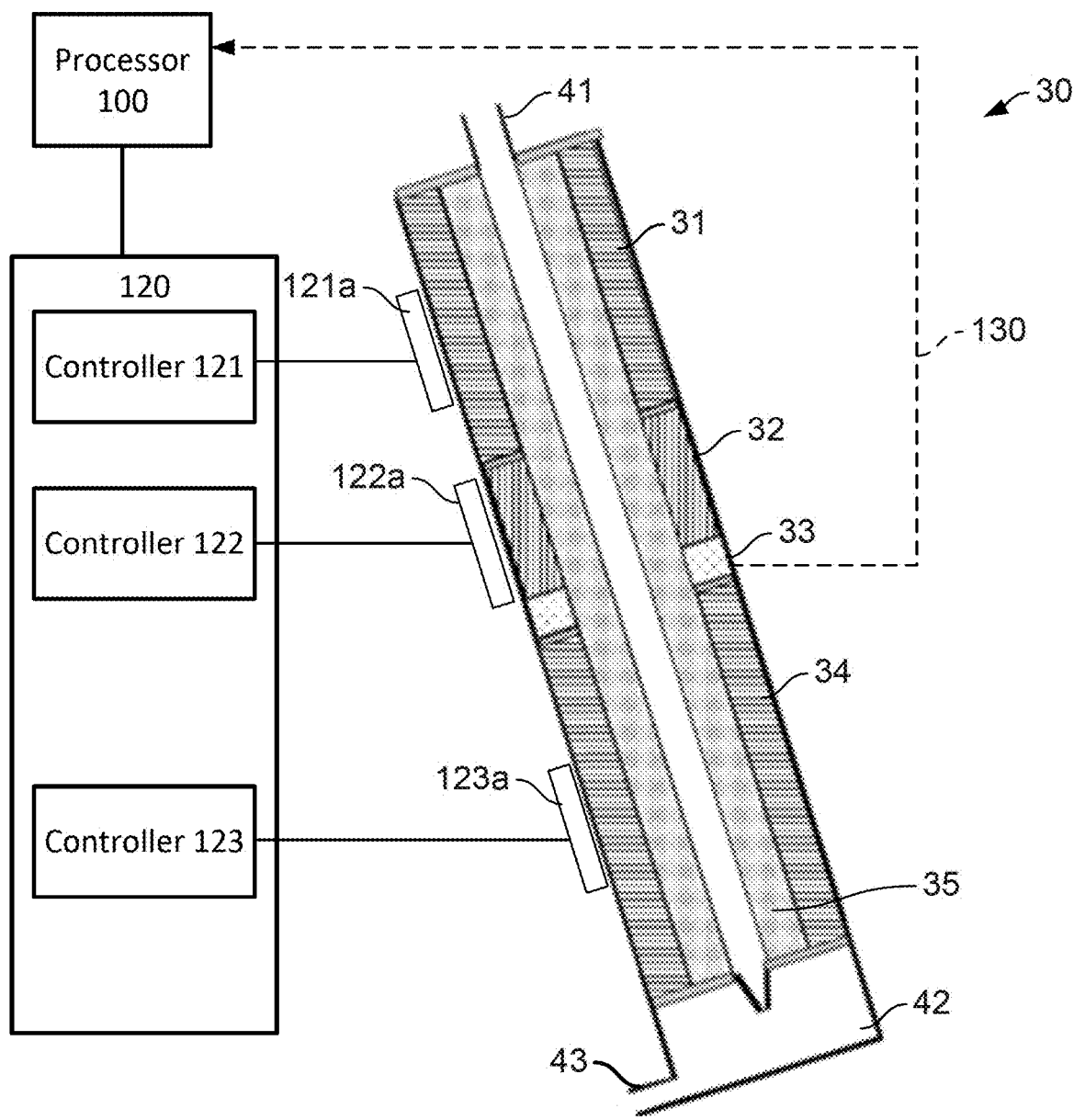
Figure 4:
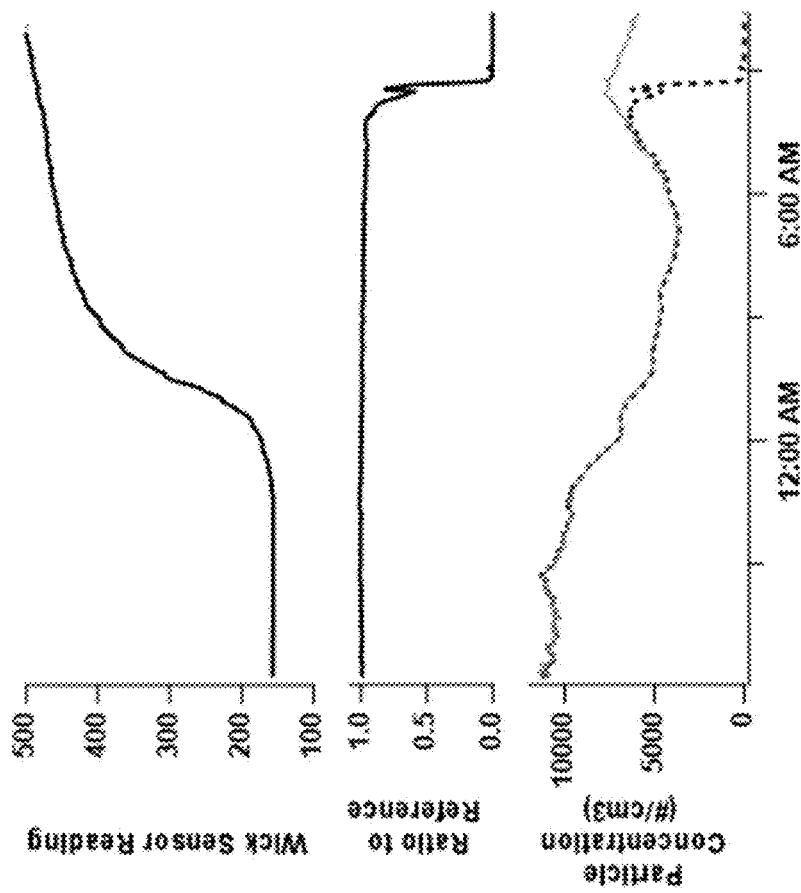
Figure 5:
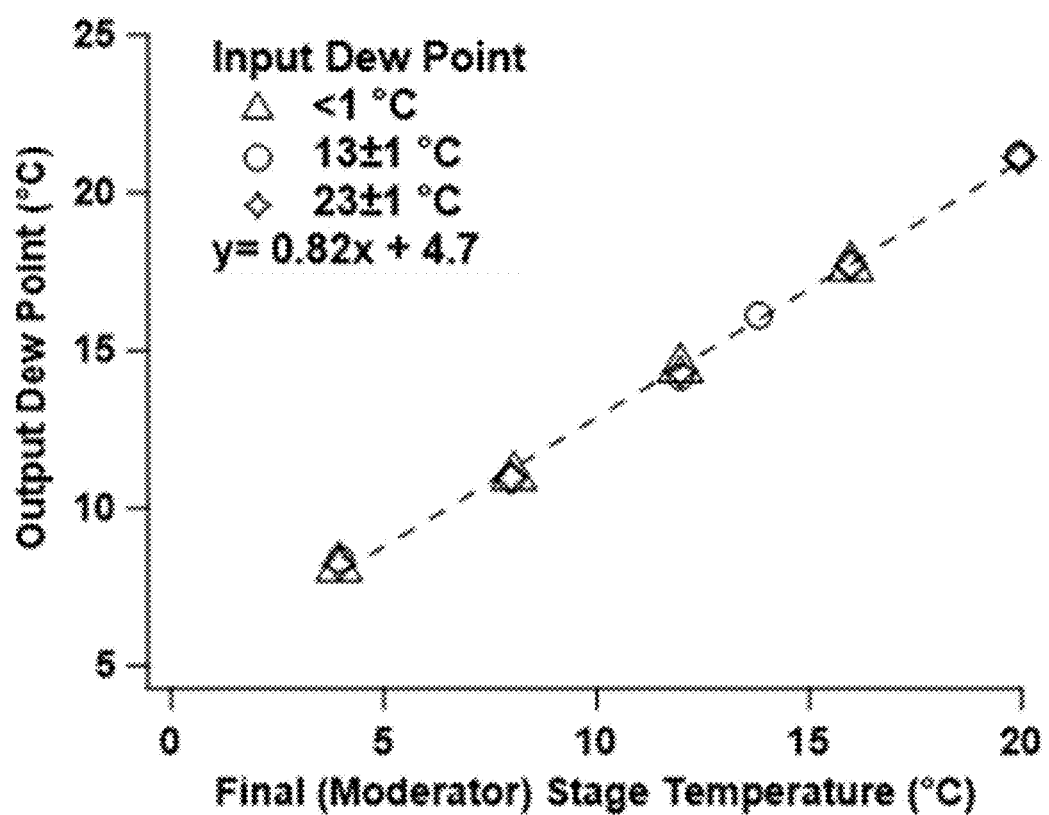

FIGS. 4A-4C illustrate the performance of the wick sensor installed in a three-stage, water-based particle condensation system like that illustrated in FIG. 3. To test the wick sensor, the condensation system is operated in a manner to purposely dry the wick. A droplet detector at the exit of the growth tube counts the number concentration of particles that are grown to form droplets. It is well known that the condensation growth system will only produce detectable sized droplets from the sampled air stream if the wick is sufficiently wet. Thus the counting efficiency of the combined condensation system and droplet detector tests whether the wick is wet. FIG. 4A is a time series of the wick sensor reading, and FIG. 4C a time series of ambient particle number concentrations. FIG. 4B illustrates the particle counting efficiency of the system. This efficiency (4B) is shown as the ratio of this indicated particle concentration to that measured by a standard, benchtop condensation particle counter. The data shows an increase in the wick sensor signal shortly after midnight, due to an increase in reflected light, indicating that the wick that is beginning to dry. The particle number concentrations measured does not change with respect to the reference for another 8 hours, at which point the wick sensor signal is quite high. These data show that this wick sensor provides ample signal of a drying wick hours in advance of loss of instrument performance.

Typically, particle condensation systems require that the wick that holds the condensing fluid be continually replenished via liquid injection, or physical contact with a liquid reservoir. Using the wick sensor, a particle condensation system capable of maintaining a properly wetted wick through recovery of water vapor from the sampled air stream is provided. This is done by using the wick sensor as a feedback signal to set the temperature of the third, moderator stage. It is the temperature of this stage that determines the amount of water vapor in the flow that exits the instrument. Importantly, model calculations presented in U.S. Pat. No. 8,801,838 (Hering et al.), and laboratory data show that the particle activation and condensational growth is independent of operating temperature of the third and final moderator stage. Thus the moderator stage operating temperature can be adjusted to control the amount of water recaptured by the wick, without affecting instrument performance. The wick sensor reading can be used to adjust the moderator temperature to add or remove water from the wick, as needed. If the wick is dryer than desired, the moderator temperature is lowered, and if it is wetter than desired, the moderator temperature is raised. A PID control algorithm can be used to adjust the moderator temperature to add or remove water from the wick, as needed.

In instances in which the instrument 30 is configured to measure the relative humidity and temperature of the sampled air stream, the corresponding dew point value can be used as a first estimate of the temperature set point of the moderator stage 34. In this instance, the control algorithm operable by the processor to control the temperature of the moderator stage 34 reduces to a function of this input dew point, and a simple proportional gain, as follows:

$$T_{mod,new}=f(DP_{in})+g^*(w_{targ}-w)$$

where:

$T_{mod,new}$ is the set point temperature for the Moderator $f(DP_{in})$ is a prediction of the $T_{mod}$ necessary to match $DP_{in}$, g is the feedback gain $w_{targ}$ is the desired wick sensor reading w is the actual wick sensor reading The reflectivity, and hence the raw wick sensor output, increases as the wick dries. Hence ($w_{targ}$−w) is a positive value when the wick is wetter than the target value, and the algorithm will increase the set point for the moderator temperature. Similarly, if ($w_{targ}$−w) is a negative, the wick is drier than the target value, and the algorithm will decrease the set point for the moderator temperature. In other words, g is positive. The function $f(DP_{in})$ returns a first estimate the moderator temperature needed to make the water vapor content of the flow exiting the instrument equal that which enters. This function is determined experimentally, and is dependent on the specific system design, but is generally, it is independent of the input relative humidity.

FIG. 5 presents data for the function $f(DP_{in})$ obtained from a three-stage, water-based particle condensation particle counter equipped with a wick sensor. This system follows the design of FIG. 3, with a continuous wick spanning the cooled conditioner, the warm initiator, the wick sensor region and the final, cooled moderator stage. It has an optical detector at the exit of the growth tube to count the number of droplets formed, from which the total particle number concentration is derived. The water content of the flow exiting the system, as indicated by the exiting dew point, is the same regardless of the dew point of the entering flow, and is dependent only on the operating temperatures of the system. This makes $f(DP_{in})$ a good first guess for the moderator temperature set point. However, this is not precise, and over time errors will accumulate. With the wick sensor, this set point can be adjusted as needed to maintain the wick at the proper moisture level.

FIGS. 6A-6C show data for a wick-sensor equipped, three-stage, water-based condensation system equipped with an optical detector for measuring particle number concentrations. FIG. 6A is a time series of the wick sensor reading, and FIG. 6C a time series of ambient particle number concentrations. FIG. 6B illustrates the particle counting efficiency of the system. With the algorithm presented above, the wick sensor reading remains constant, and the instrument readings are comparable to a benchtop particle counter. During these measurements, the ambient dew point ranged from 10 to 14° C. With the wick-sensor and three-stage water condensation systems, experimental results have provided months of continuous operation without replenishing the wick. In other words, all the water needed for condensational growth can be captured from the sampled air stream, with the wick sensor signal ensuring that the wick maintains the ideal saturation level, neither too wet nor too dry.

In situations where the prevailing ambient air contains very little water vapor, i.e. when the prevailing dew point is low, the sustained operation requires some humidification of the sampled air stream. This can be accomplished by passing the sample air flow through a short piece of Nafion (R) tubing (available from Permapure, Lakewood, N.J.) that is surrounded by liquid water, or by high humidity air such as can be obtained using a hygroscopic salt such as sodium polyacrylate.

The implementation of the wick sensor presented here is for a water-based condensation system adapted to particle counting. This same approach could be used for a condensation system for particle collection, or aerodynamic particle focusing. The wick sensor is applicable to alcohol-based condensation system using a microporous wick, or to any working fluid with a similar refractive index such that the light scattering from the wick decreases as the pores are filled with the liquid. Although the implementation here is presented with a condensation system without a liquid reservoir, it could also be used in a system where the working fluid is injected into the wick. In this instance the sensor would minimize the amount of working fluid consumed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A wick liquid sensor in a particle condensation system, comprising:
   a particle growth tube of the particle condensation system containing a wick, the wick comprised of a microporous material which reflects light when dry and becomes translucent as pores in the wick fill with liquid;
   a light source configured to illuminate a surface of the wick in the growth tube; and
   a detector configured to detect an intensity of light which is reflected by the wick and determine the intensity of reflected light;
   the detector is configured to measure an amount of liquid in the wick is based on the intensity of the wick reflected light.

2. The sensor of claim 1 wherein the microporous material is a membrane filter.

3. The sensor of claim 1 wherein the liquid is water or alcohol.

4. The sensor of claim 1 wherein the light source and detector are provided in a housing mounted adjacent to the wick.

5. The sensor of claim 1 further including a light absorbing material positioned opposite the light source and detector below at least one layer of the microporous material.

6. The sensor of claim 1 wherein reflectivity of the wick decreases as saturation content of the liquid in the wick increases.

7. A particle condensation system, comprising:
   a growth tube of the particle condensation system containing a wick, the wick comprised of a microporous material which reflects light when dry and becomes translucent as pores in the wick fills with liquid;
   a wick sensor configured to determine liquid saturation of the wick, the wick sensor comprising
      an illumination source positioned to illuminate the wick;
      a light absorbing material placed under one or more layers of the wick opposite of the illumination source; and
      a detector configured to measure the saturation of the wick based on an intensity of light which is reflected by the wick.

8. The system of claim 7 wherein the light absorbing material is wettable by the saturating liquid.

9. The system of claim 8 wherein the microporous material is a membrane filter.

10. The system of claim 8 wherein the liquid is water.

11. The sensor of claim 8 wherein the liquid is alcohol.

12. The system of claim 8 wherein an output of the sensor is used as feedback signal to regulate a temperature or other operating parameter of the system.

13. A particle condensation system, comprising:
    a growth tube of the particle condensation system including a wick formed from multiple layers of a microporous material which reflects light when dry and becomes translucent as pores in the wick fill with a liquid; and
    a wick sensor comprising a light source configured to illuminate a surface of the wick and a detector configured to measure an amount of the liquid in the wick based on a determination of an intensity of light which is reflected by the wick.

14. The system of claim 13 further including a light absorbing material placed under one or more layers of the wick opposite of the illumination source.

15. The particle condensation system of claim 13 further including a tube inlet and a tube outlet, the system including a humidification system at the inlet.

16. The particle condensation system of claim 15 where the humidification system uses a hygroscopic material.

17. The system of claim 13 wherein the tube has a first section, a second section and a third section though which air flows between an inlet and an outlet, a temperature of the second section is warmer than that of the first section at the inlet and the third section at the outlet, wherein the sensor is provided in a housing between the second section and the third section.

18. The system of claim 13 wherein reflectivity of the wick increases as the wick dries.

19. The system of claim 13 wherein the light source and detector are provided in a housing mounted adjacent to the wick.

20. The system of claim 13 wherein an output of the sensor is used as feedback signal to regulate a temperature or other operating parameter of the system.

* * * * *

UNITED STATES PATENT AND TRADEMARK OFFICE
CERTIFICATE OF CORRECTION

PATENT NO. : 11,029,240 B2  
APPLICATION NO. : 16/159604  
DATED : June 8, 2021  
INVENTOR(S) : Hering et al.

Page 1 of 1

It is certified that error appears in the above-identified patent and that said Letters Patent is hereby corrected as shown below:

On the Title Page

Page 2, Column 2, Other Publications (Line 39), please change "Aerosl" to -- Aerosol --.

In the Claims

Column 7, Line 26 (Claim 1, Line 14), please change "wick is" to -- wick --.

Signed and Sealed this  
Thirty-first Day of August, 2021

Drew Hirshfeld  
*Performing the Functions and Duties of the*  
*Under Secretary of Commerce for Intellectual Property and*  
*Director of the United States Patent and Trademark Office*